US012743957B2

(12) United States Patent
Harada

(10) Patent No.: US 12,743,957 B2
(45) Date of Patent: Sep. 22, 2026

(54) MOBILE BODY CONTROL DEVICE, MOBILE BODY CONTROL METHOD, AND NON-TRANSITORY COMPUTER-READABLE STORAGE MEDIUM

(71) Applicant: HONDA MOTOR CO., LTD., Tokyo (JP)

(72) Inventor: Yuta Harada, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 15 days.

(21) Appl. No.: 18/978,530

(22) Filed: Dec. 12, 2024

(65) Prior Publication Data

US 2025/0201126 A1 Jun. 19, 2025

(30) Foreign Application Priority Data

Dec. 13, 2023 (JP) ................................ 2023-210280

(51) Int. Cl.

| | |
|---|---|
| ***G08G 1/16*** | (2006.01) |
| ***B60W 30/16*** | (2020.01) |
| ***B60W 40/04*** | (2006.01) |
| ***G08G 1/0967*** | (2006.01) |

(52) U.S. Cl.

CPC ............ *G08G 1/166* (2013.01); *B60W 30/16* (2013.01); *B60W 40/04* (2013.01); *G08G 1/0967* (2013.01); *B60W 2552/10* (2020.02); *B60W 2554/406* (2020.02); *B60W 2720/106* (2013.01); *B60W 2754/30* (2020.02)

(58) Field of Classification Search

CPC ..... G08G 1/166; G08G 1/0967; B60W 30/16; B60W 40/04; B60W 2552/10; B60W 2554/406; B60W 2720/106; B60W 2754/30; G05D 1/43; G05D 1/242

See application file for complete search history.

(56) References Cited

U.S. PATENT DOCUMENTS

| | | | | |
|---|---|---|---|---|
| 11,987,237 | B2 * | 5/2024 | Abad | B60W 30/09 |
| 2013/0099911 | A1 * | 4/2013 | Mudalige | G08G 1/163 701/23 |
| 2017/0291608 | A1 * | 10/2017 | Engel | B60W 30/18163 |
| 2020/0086867 | A1 * | 3/2020 | Manocha | B60W 30/12 |
| 2021/0009127 | A1 * | 1/2021 | Horiba | B60W 50/0097 |

(Continued)

FOREIGN PATENT DOCUMENTS

| | | |
|---|---|---|
| JP | 6096750 B2 | 3/2017 |

*Primary Examiner* — Abdalla A Khaled

(74) *Attorney, Agent, or Firm* — Armstrong Teasdale LLP

(57) ABSTRACT

A mobile body control device includes, a mobile body detector configured to acquire a position of a first mobile body and a position of a second mobile body, a regulation body detector configured to detect a position of a regulation body, a distance calculator configured to acquire a first distance from the first mobile body to the second mobile body and a second distance from the first mobile body to an end of the regulation body, and a movement controller configured to execute movement control of at least one of the first mobile body and the second mobile body. The movement controller is configured to execute the movement control in a case where the first distance is equal to or more than the second distance, and not to execute the movement control in a case where the first distance is less than the second distance.

9 Claims, 5 Drawing Sheets

(56) References Cited

U.S. PATENT DOCUMENTS

| | | | | |
|---|---|---|---|---|
| 2021/0237738 | A1* | 8/2021 | Yu | B60W 10/04 |
| 2023/0306851 | A1* | 9/2023 | Mizoguchi | G08G 1/164 |
| 2024/0071223 | A1* | 2/2024 | Oyama | B60W 30/09 |
| 2024/0123983 | A1* | 4/2024 | Morimoto | B60W 30/09 |
| 2025/0136116 | A1* | 5/2025 | Oyama | B60W 30/18163 |

* cited by examiner

Fig.1

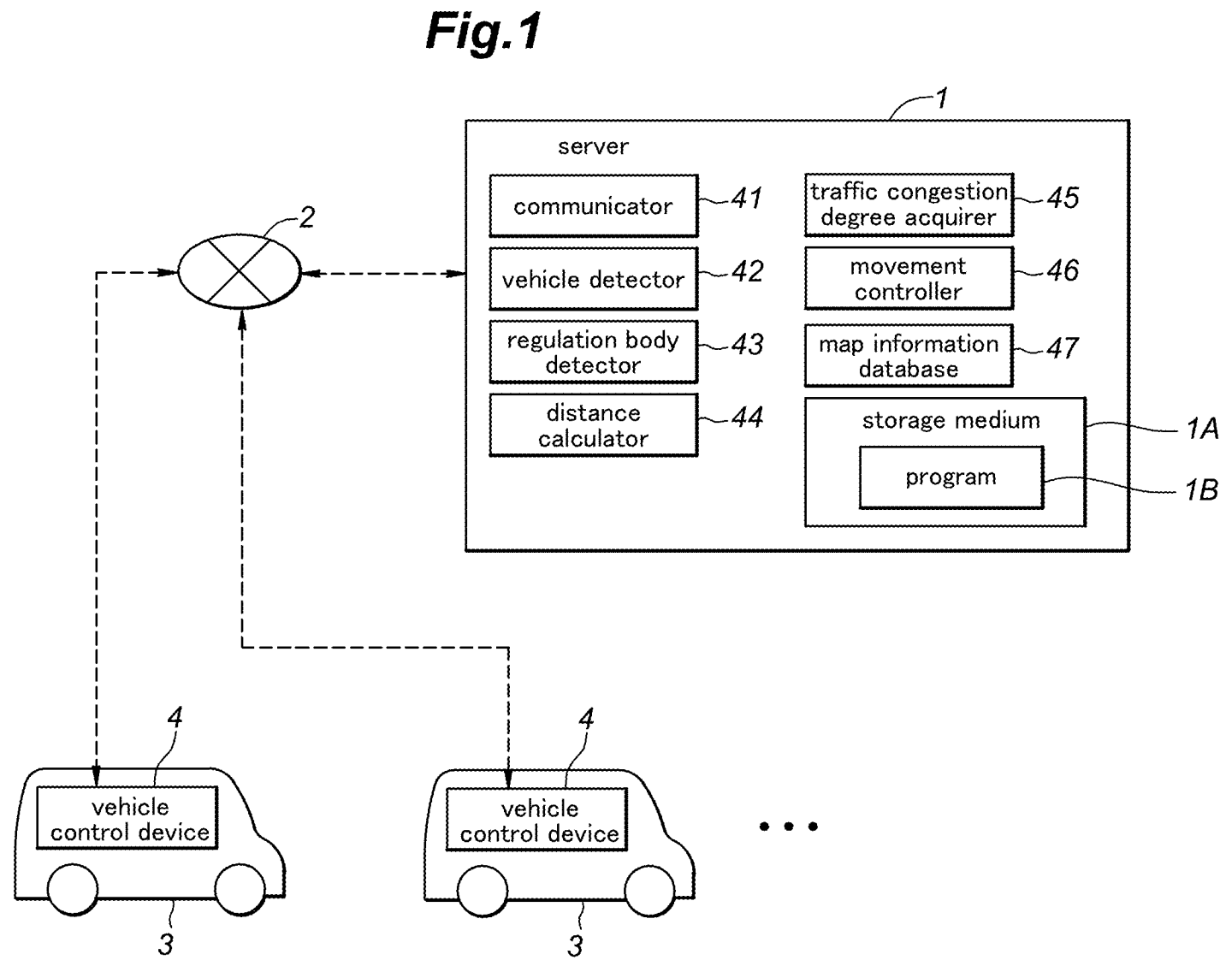

1
server
communicator 41
vehicle detector 42
regulation body detector 43
distance calculator 44
traffic congestion degree acquirer 45
movement controller 46
map information database 47
storage medium 1A
program 1B
2
4 vehicle control device 3
4 vehicle control device 3

100
117
102C
112
111
107A
107
117
D2
3B(3)
D1
102B
3A(3)
102
117
105
102A
101
104

MOBILE BODY CONTROL DEVICE, MOBILE BODY CONTROL METHOD, AND NON-TRANSITORY COMPUTER-READABLE STORAGE MEDIUM

TECHNICAL FIELD

The present invention relates to a mobile body control device, a mobile body control method, and a non-transitory computer-readable storage medium.

BACKGROUND ART

In recent years, there have been increasing efforts to provide sustainable transportation systems that take into consideration vulnerable people among transport participants. To achieve this goal, research and development for driving assistance technologies and autonomous driving technologies is conducted to further improve traffic safety and convenience.

Japanese Patent No. 6096750 discloses a travel assistance device that controls travel of a first mobile body or a second mobile body such that the first mobile body traveling in a main lane and the second mobile body traveling in an auxiliary lane do not interfere with each other in a merging area where the auxiliary lane merges with the main lane.

Between the main lane and the auxiliary lane, a plurality of regulation bodies such as rubber poles may be arranged. The regulation bodies regulate a lane change of a mobile body from the auxiliary lane to the main lane and thereby limiting a region where the mobile body can enter the main lane. If the travel of the first mobile body is restricted by the second mobile body in a region where these regulation bodies exist, the occupant of the first mobile body may feel uncomfortable.

SUMMARY OF THE INVENTION

In view of the above background, an object of the present invention is to provide a mobile body control device, a mobile body control method, and a non-transitory computer-readable storage medium that can execute appropriate movement control in a region of a merging area where a regulation body exists. Accordingly, an aim of the present invention is to contribute to the development of sustainable transportation systems.

To achieve such an object, one aspect of the present invention provides a mobile body control device (1) configured to execute movement control of at least one of a first mobile body (3A) moving along a first travel route (101) and a second mobile body (3B) moving along a second travel route (102) in a merging area (100) including the first travel route, the second travel route that merges with the first travel route, and a regulation body (107) arranged on a boundary between the first travel route and the second travel route and configured to regulate a movement from the second travel route to the first travel route, the mobile body control device comprising: a mobile body detector (42) configured to acquire a position of the first mobile body and a position of the second mobile body; a regulation body detector (43) configured to detect a position of the regulation body; a distance calculator (44) configured to acquire a first distance (D1) from the first mobile body to the second mobile body and a second distance (D2) from the first mobile body to a regulation body end (107A) that is an end of the regulation body in a travel direction of the first travel route; and a movement controller (46) configured to execute the movement control of the at least one of the first mobile body and the second mobile body in the merging area to avoid interference between the first mobile body and the second mobile body, wherein the movement controller is configured to execute the movement control of the at least one of the first mobile body and the second mobile body in a case where the first distance is equal to or more than the second distance, and not to execute the movement control of either the first mobile body or the second mobile body in a case where the first distance is less than the second distance.

According to this aspect, in a region where the regulation body that regulates a lane change (namely, a movement) from the second travel route to the first travel route exists, the movement control of the first mobile body caused by the second mobile body is not executed. Accordingly, it is possible to provide a mobile body control device that can execute appropriate movement control in a region of the merging area where the regulation body exists.

In the above aspect, preferably, the movement controller is configured to accelerate the at least one of the first mobile body and the second mobile body by the movement control in a case where the first distance is equal to or more than the second distance.

According to this aspect, by accelerating the at least one of the first mobile body and the second mobile body, the interference between the first mobile body and the second mobile body is avoided.

In the above aspect, preferably, the mobile body control device further comprises a traffic congestion degree acquirer (45) configured to acquire a traffic congestion degree of the first travel route, wherein the movement controller is configured to execute the movement control of the at least one of the first mobile body and the second mobile body in a case where the first distance is equal to or more than the second distance and the traffic congestion degree is equal to or less than a prescribed traffic congestion determination value, and not to execute the movement control of either the first mobile body or the second mobile body in a case where the first distance is less than the second distance or the traffic congestion degree is more than the traffic congestion determination value.

According to this aspect, the movement controller does not execute unnecessary movement control when the traffic congestion degree is high.

In the above aspect, preferably, the movement controller is configured to execute the movement control of the at least one of the first mobile body and the second mobile body in a case where the first distance is equal to or more than the second distance and the second mobile body and the regulation body end are arranged forward of the first mobile body, and not to execute the movement control of either the first mobile body or the second mobile body in a case where the first distance is less than the second distance or the second mobile body or the regulation body end is not arranged forward of the first mobile body.

According to this aspect, the movement controller does not execute unnecessary movement control in a case where the second mobile body is arranged rearward of the first mobile body.

In the above aspect, preferably, the distance calculator is configured to acquire, as the first distance, a distance from a center of a front end of the first mobile body to a center of a rear end of the second mobile body, and to acquire, as the second distance, a distance from the center of the front end of the first mobile body to the regulation body end.

In the above aspect, preferably, when changing an acceleration of the at least one of the first mobile body and the second mobile body by the movement control, the movement controller is configured to control a notifier (19) of the at least one of the first mobile body and the second mobile body the acceleration of which is changed and thereby to give a notification to an occupant.

According to this aspect, the occupant can recognize that the movement control is executed, and thereby understanding the behavior of the mobile body.

Another aspect of the present invention provides a mobile body control device (4) provided in a first mobile body (3A) moving along a first travel route (101) in a merging area (100) including the first travel route, a second travel route (102) that merges with the first travel route, and a regulation body (107) arranged on a boundary between the first travel route and the second travel route and configured to regulate a movement from the second travel route to the first travel route, the mobile body control device comprising: an external environment detector (34) configured to detect a position of a second mobile body (3B) moving along the second travel route and a position of the regulation body; an own mobile body position detector (35) configured to detect a position of the first mobile body; and an action planner (36) configured to execute movement control of the first mobile body in the merging area to avoid interference between the first mobile body and the second mobile body, wherein the action planner is configured to calculate a first distance (D1) from the first mobile body to the second mobile body and a second distance (D2) from the first mobile body to a regulation body end (107A) that is an end of the regulation body in a travel direction of the first travel route, to execute the movement control of the first mobile body in a case where the first distance is equal to or more than the second distance, and not to execute the movement control of the first mobile body in a case where the first distance is less than the second distance.

Still another aspect of the present invention provides a mobile body control method for a computer to execute movement control of at least one of a first mobile body (3A) moving along a first travel route (101) and a second mobile body (3B) moving along a second travel route (102) in a merging area (100) including the first travel route, the second travel route that merges with the first travel route, and a regulation body (107) arranged on a boundary between the first travel route and the second travel route and configured to regulate a movement from the second travel route to the first travel route, the mobile body control method comprising: acquiring a position of the first mobile body and a position of the second mobile body; detecting a position of the regulation body; acquiring a first distance (D1) from the first mobile body to the second mobile body and a second distance (D2) from the first mobile body to a regulation body end (107A) that is an end of the regulation body in a travel direction of the first travel route; executing the movement control of the at least one of the first mobile body and the second mobile body in the merging area to avoid interference between the first mobile body and the second mobile body; executing the movement control of the at least one of the first mobile body and the second mobile body in a case where the first distance is equal to or more than the second distance; and not executing the movement control of either the first mobile body or the second mobile body in a case where the first distance is less than the second distance.

Still another aspect of the present invention provides a non-transitory computer-readable storage medium comprising a program for executing movement control of at least one of a first mobile body (3A) moving along a first travel route (101) and a second mobile body (3B) moving along a second travel route (102) in a merging area (100) including the first travel route, the second travel route that merges with the first travel route, and a regulation body (107) arranged on a boundary between the first travel route and the second travel route and configured to regulate a movement from the second travel route to the first travel route, wherein the program, when executed by a computer, executes a mobile body control method comprising: acquiring a position of the first mobile body and a position of the second mobile body; detecting a position of the regulation body; acquiring a first distance (D1) from the first mobile body to the second mobile body and a second distance (D2) from the first mobile body to a regulation body end (107A) that is an end of the regulation body in a travel direction of the first travel route; executing the movement control of the at least one of the first mobile body and the second mobile body in the merging area to avoid interference between the first mobile body and the second mobile body; executing the movement control of the at least one of the first mobile body and the second mobile body in a case where the first distance is equal to or more than the second distance; and not executing the movement control of either the first mobile body or the second mobile body in a case where the first distance is less than the second distance.

Thus, according to the above aspects, it is possible to provide a mobile body control device, a mobile body control method, and a non-transitory computer-readable storage medium that can execute appropriate movement control in a region of a merging area where a regulation body exists.

BRIEF DESCRIPTION OF THE DRAWING(S)

FIG. 1 is a block diagram of a server;

DETAILED DESCRIPTION OF THE INVENTION

Figure 2:
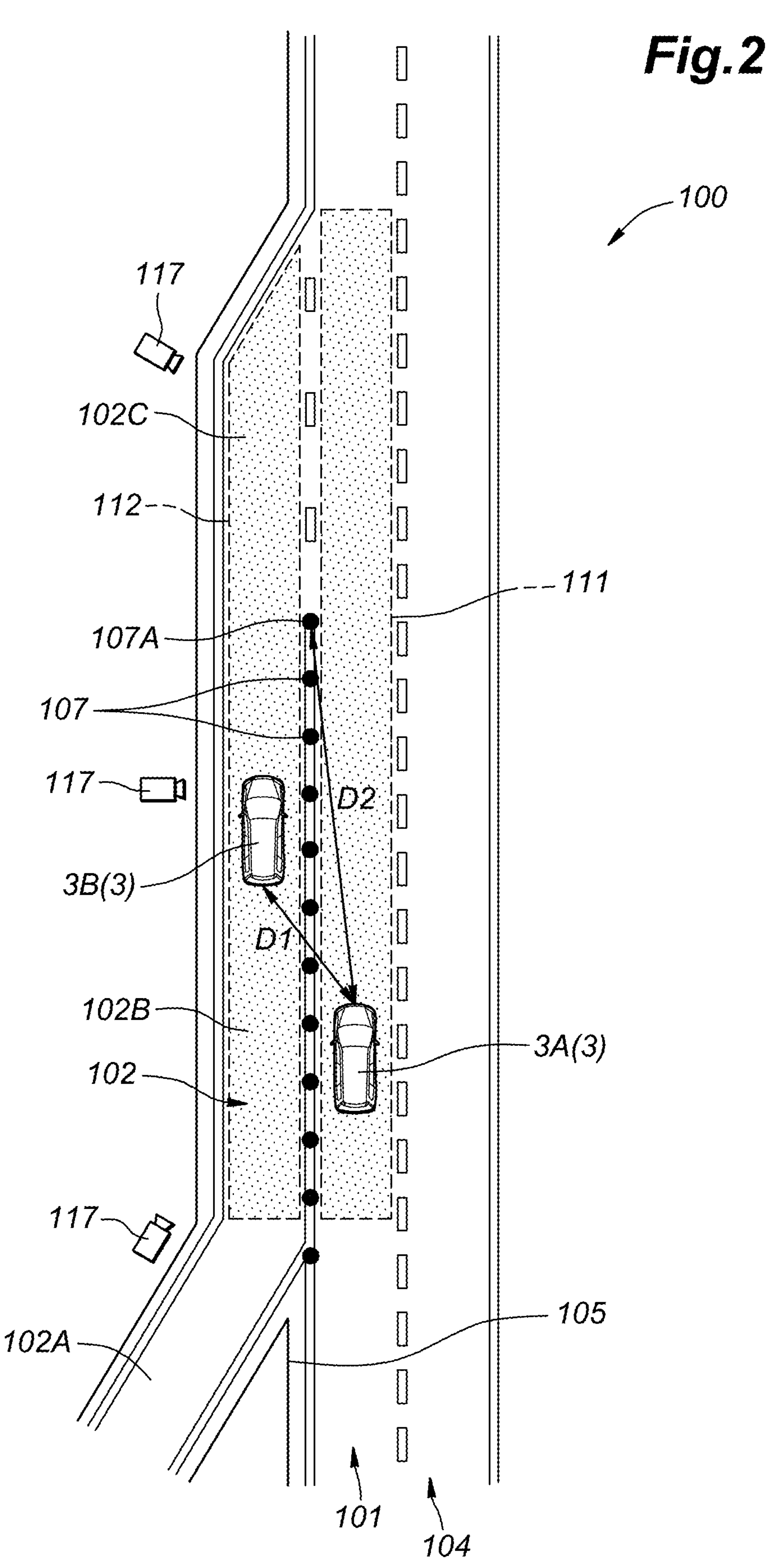
FIG. 2 is an explanatory diagram showing a merging area.

Hereinafter, with reference to the drawings, an embodiment of a mobile body control device, a mobile body control method, and a non-transitory computer-readable storage medium according to the present invention will be described. A mobile body includes a vehicle such as an automobile, a truck, and a motorcycle, an electric kick scooter, and the like. In the present embodiment, an example in which the mobile body is a vehicle will be described.

As shown in FIG. 1, a server 1 as a mobile body control device communicates with vehicle control devices 4 of a plurality of vehicles 3 via a communication network 2. The server 1 controls the plurality of vehicles 3 in a merging area 100 and thereby preventing the plurality of vehicles 3 from interfering with each other.

(Merging Area 100)

As shown in FIG. 2, the merging area 100 includes a first travel route 101, and a second travel route 102 that merges with the first travel route 101. The first travel route 101 extends straight. The first travel route 101 may be an end lane of a main lane 104 that includes a plurality of lanes. Further, the main lane 104 may be composed of only the first travel route 101. The second travel route 102 may also be called "the merging lane". In the first travel route 101 and the second travel route 102, a travel direction of each vehicle 3 is set to a forward direction.

The second travel route 102 includes, in the order from the rear to the front, a first portion 102A, a second portion 102B, and a third portion 102C. The first portion 102A is partitioned from the first travel route 101 with a hard nose 105. The first portion 102A may be arranged away from the first travel route 101. Further, the first portion 102A may incline relative to the first travel route 101. A side portion of a front end of the first portion 102A is connected to a side portion of the first travel route 101. The hard nose 105 may be formed by a structure such as a wall or a guardrail.

The second portion 102B extends along the first travel route 101. A road surface of the second portion 102B may be connected to a road surface of the first travel route 101 with respect to the lateral direction. At least one regulation body 107 is arranged on the boundary between the second portion 102B of the second travel route 102 and the first travel route 101. The regulation body 107 regulates the movement of the vehicles 3 from the second travel route 102 to the first travel route 101. The regulation body 107 may be provided continuously or intermittently along the boundary between the first travel route 101 and the second travel route 102. The regulation body 107 may be composed of structures such as a plurality of poles, pylons, road studs, curbs, and the like. A guard rope may be stretched between the plurality of poles. The regulation body 107 may also be called "the soft nose". A front end of the regulation body 107 is called "the regulation body end 107A".

The third portion 102C extends along the first travel route 101. The third portion 102C forms an end of the second travel route 102. The vehicles 3 can change lanes (i.e., move) from the second travel route 102 to the first travel route 101 in the third portion 102C. The third portion 102C may also be called "the merging point". A side edge of the third portion 102C opposite to a side of the first travel route 101 inclines forward toward the side of the first travel route 101.

The regulation body 107 is provided for the purpose of limiting the merging point of the second travel route 102 to the third portion 102C. The regulation body 107 is arranged lower and more dispersedly than the hard nose 105. Accordingly, sensors such as a radar 14A, a lidar 14B, and a camera 14C can detect objects such as the vehicles 3 through the regulation body 107.

An area of the first travel route 101 arranged on a lateral side of the second portion 102B and the third portion 102C of the second travel route 102 is defined as a first area 111. The second portion 102B and the third portion 102C of the second travel route 102 are defined as a second area 112.

(Vehicle 3)

Figure 3:
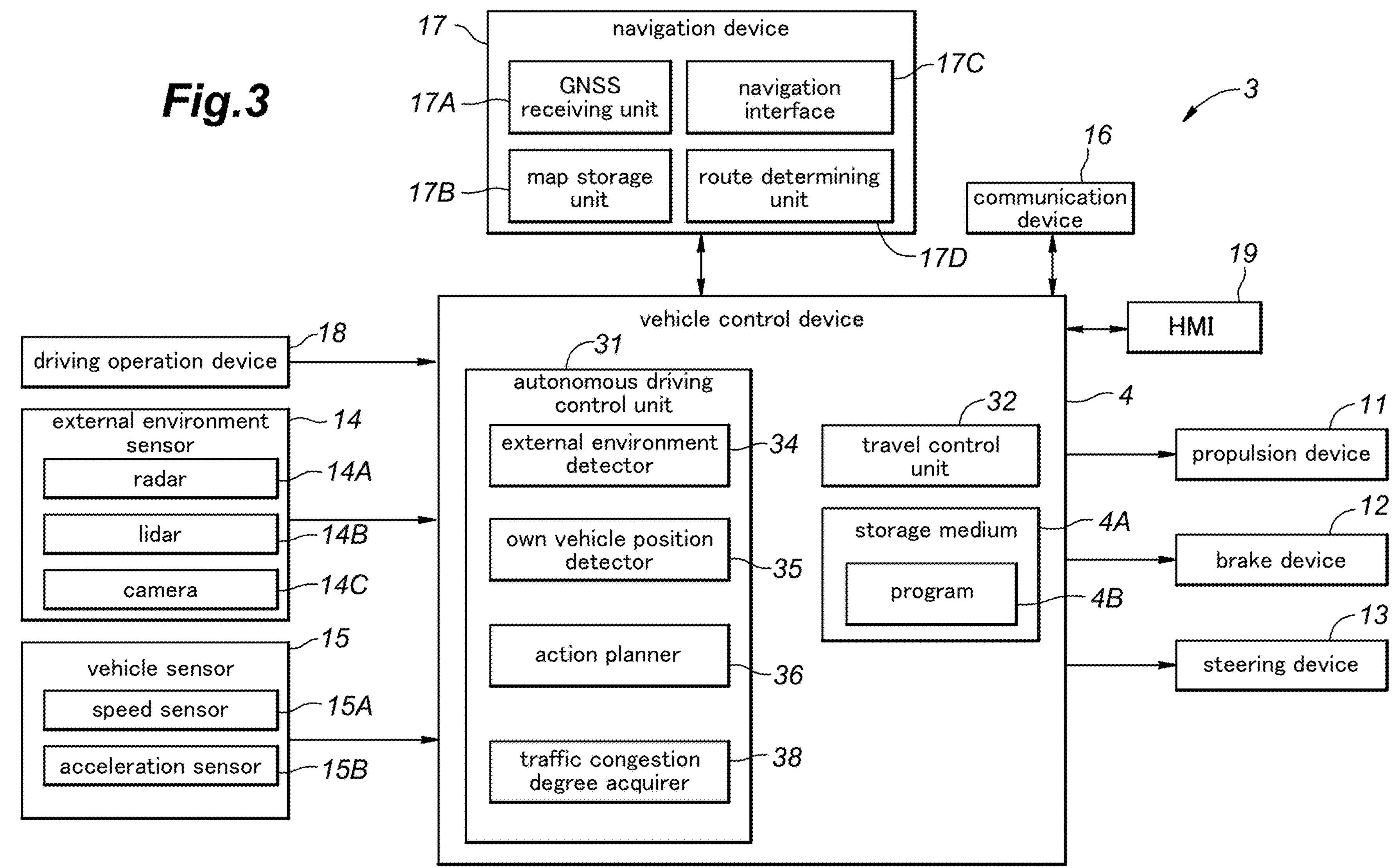
FIG. 3 is a block diagram of a vehicle.

As shown in FIG. 3, each vehicle 3 (mobile body) includes a propulsion device 11, a brake device 12, a steering device 13, an external environment sensor 14, a vehicle sensor 15, a communication device 16, a navigation device 17, a driving operation device 18, a human machine interface 19 (HMI), and the abovementioned vehicle control device 4.

The propulsion device 11 is a device that applies a driving force to the vehicle 3, and includes, for example, a power source and a transmission. The power source includes at least one of an internal combustion engine such as a gasoline engine and a diesel engine, and an electric motor. The brake device 12 is a device that applies a braking force to the vehicle 3, and includes, for example, a brake caliper that presses a pad against a brake rotor, and an electric cylinder that supplies hydraulic pressure to the brake caliper. The brake device 12 may further include a parking brake device that restricts the rotation of wheels by a wire cable. The steering device 13 is a device that changes a steering angle of the wheels, and includes, for example, a rack-and-pinion mechanism that steers the wheels, and an electric motor that drives the rack-and-pinion mechanism. The propulsion device 11, the brake device 12, and the steering device 13 are controlled by the vehicle control device 4.

The external environment sensor 14 is a sensor that captures electromagnetic waves or light from the periphery of the vehicle 3 and detects objects and the like outside the vehicle 3. The external environment sensor 14 includes, for example, a radar 14A, a lidar 14B (LiDAR), and a camera 14C (external camera). The external environment sensor 14 outputs a detection result to the vehicle control device 4.

The radar 14A detects the position (distance and direction) of each object by emitting radio waves such as millimeter waves toward the periphery of the vehicle 3 and capturing the reflected waves thereof. At least one radar 14A is attached to any portion of the vehicle 3. It is preferable that the radar 14A includes at least a front radar that emits radio waves toward the front of the vehicle 3, a rear radar that emits radio waves toward the rear of the vehicle 3, and a pair of left and right side radars that emits radio waves toward the lateral sides of the vehicle 3.

The lidar 14B detects the position (distance and direction) of each object by emitting light such as infrared rays toward the periphery of the vehicle 3 and capturing the reflected light thereof. At least one lidar 14B is provided at any portion of the vehicle 3.

The camera 14C captures images of the periphery of the vehicle 3 such as the objects (for example, peripheral vehicles and pedestrians) that exist on the periphery of vehicle 3, the shapes of guardrails, curbs, walls, median strips, and roads, and the road markings painted on the roads. The camera 14C may be, for example, a digital camera using a solid-state image sensing device such as a CCD or a CMOS. At least one camera 14C is provided at any portion of the vehicle 3. The camera 14C includes at least a front camera that captures the image of the front of the vehicle 3. The camera 14C may further include a rear camera that captures the image of the rear of the vehicle 3, and a pair of side cameras that captures the images of the lateral sides of the vehicle 3. The camera 14C may be, for example, a stereo camera.

The vehicle sensor 15 includes a speed sensor 15A that detects the speed (vehicle speed) of the vehicle 3, and an acceleration sensor 15B that detects the acceleration of the vehicle 3. The vehicle sensor 15 may further include a yaw rate sensor, and a steering angle sensor that detects the steering angle of front wheels as steered wheels.

The communication device 16 mediates communication between the devices (the vehicle control device 4 and the navigation device 17) arranged inside the vehicle 3 and the devices (other vehicles 3 and the server 1) arranged outside the vehicle 3. The vehicle control device 4 can wirelessly communicate with the other vehicles 3 via the communication device 16. Further, the communication device 16 wirelessly communicates with a base station connected to the communication network 2, and communicates with the server 1 via the communication network 2. The base station may be arranged near the merging area 100 (see FIG. 2).

The navigation device 17 is a device that acquires the current position of the vehicle 3 and provides route guidance to the destination and the like. The navigation device 17 includes a GNSS receiving unit 17A, a map storage unit 17B, a navigation interface 17C, and a route determining unit 17D. The GNSS receiving unit 17A identifies the position (latitude and longitude) of the vehicle 3 based on the signals received from artificial satellites (positioning satellites). The map storage unit 17B is composed of a known storage device such as a flash memory or a hard disk, and stores map information.

The map information includes road information including a road type such as an expressway, a toll road, a national road, and a prefectural road, the number of lanes on each road, a center position (a three-dimensional coordinate including longitude, latitude, and height) of each lane, the shapes of road markings such as road partition lines and lane boundaries, the presence or absence of sidewalks, curbs, fences, and the like, the positions of intersections, the positions of lane merging points and lane branching points, the areas of emergency parking zones, the width of each lane, road markings, and the like. The map information may also include traffic regulation information, address information (address and postal code), facility information, telephone number information, and the like. The route determining unit 17D determines a route to the destination based on the position of the vehicle 3 identified by the GNSS receiving unit 17A, the destination input from the navigation interface 17C, and the map information. Further, when determining the route, the route determining unit 17D may further determine a target lane in which the vehicle 3 should travel by referring to the positions of lane merging points and lane branching points in the map information.

The driving operation device 18 accepts an input operation performed by a driver to control the vehicle 3. The driving operation device 18 includes, for example, a steering wheel, an accelerator pedal, and a brake pedal. The driving operation device 18 may further include a shift lever, a parking brake lever, and the like. A sensor that detects the operation amount of the input operation is attached to each component of the driving operation device 18. The driving operation device 18 outputs a signal indicating the operation amount to the vehicle control device 4.

The HMI 19 functions as a notifier that notifies an occupant (for example, the driver) of various information by display and sound, and also functions as an input device that accepts an input operation by the occupant.

The vehicle control device 4 is an electronic control unit (ECU), namely, a computer, composed of an MPU (microprocessor), ROM, RAM, and the like. The vehicle control device 4 executes various vehicle control as the MPU executes a calculation process according to a program. The vehicle control device 4 may be configured as a single piece of hardware, or may be configured as a unit composed of plural pieces of hardware. Furthermore, at least a portion of each functional unit of the vehicle control device 4 may be realized by hardware such as an LSI, an ASIC, and an FPGA, or may be realized by a combination of software and hardware. The program may be stored in a non-volatile storage device such as an HDD and flash memory of the vehicle control device 4. Alternatively, the program may be stored in a removable storage medium such as a DVD or a CD-ROM and installed in the storage device of the vehicle control device 4 as the storage medium is read by a reading device. Alternatively, the program may be downloaded in the storage device of the vehicle control device 4 via a communication line such as the Internet and installed in the storage device thereof. The vehicle control device 4 as a computer executes a travel control method that will be described later for executing travel control of the vehicle 3. The program causes the vehicle control device 4 to execute the travel control of the vehicle 3 (mobile body). As shown in FIG. 3, the vehicle control device 4 includes a non-transitory computer-readable storage medium 4A including a program 4B for executing the travel control of the vehicle 3. The program 4B, when executed by the vehicle control device 4 as a computer, executes a vehicle control method (mobile body control method) that will be described later.

The vehicle control device 4 includes an autonomous driving control unit 31 and a travel control unit 32. The autonomous driving control unit 31 includes an external environment detector 34, an own vehicle position detector 35, and an action planner 36.

The external environment detector 34 detects obstacles that exist on the periphery of the vehicle 3, the shapes of roads, the presence or absence of sidewalks, and road markings based on the signal from the external environment sensor 14. The obstacles include, for example, guardrails, utility poles, peripheral mobile bodies, and people such as pedestrians. The peripheral mobile body includes the other vehicles 3. The external environment detector 34 may detect the positions and distances of the obstacles, the other vehicles 3 (peripheral vehicles), and the like relative to the vehicle 3 based on the signal from at least one of the radar 14A, the lidar 14B, and the camera 14C. Further, the external environment detector 34 may detect the speeds of the other vehicles 3 present around the vehicle 3.

The external environment detector 34 detects the position of the regulation body 107 in the merging area 100. In particular, the external environment detector 34 acquires the position of the regulation body end 107A. Further, the external environment detector 34 of the vehicle 3 traveling along the first travel route 101 detects the position and speed of the vehicle 3 traveling along the second portion 102B and the third portion 102C of the second travel route 102. Further, the external environment detector 34 of the vehicle 3 traveling along the second travel route 102 detects the position and speed of the vehicle 3 traveling along the first travel route 101.

The own vehicle position detector 35 calculates an own vehicle position based on the signals (GNSS signals) received by the GNSS receiving unit 17A. Further, the own vehicle position detector 35 recognizes a travel lane that is a lane in which the vehicle 3 is traveling, and a relative position and angle of the vehicle 3 relative to the travel lane. The own vehicle position detector 35 may, for example, recognize the travel lane based on the map information stored in the map storage unit 17B and the position of the vehicle 3 acquired (identified) by the GNSS receiving unit 17A. Further, the own vehicle position detector 35 may recognize the relative position and angle of the vehicle 3 relative to the travel lane by extracting, from the map information, the partition lines on the periphery of the vehicle 3 drawn on a road surface and comparing the extracted partition lines with the shapes of the partition lines captured by the camera 14C.

The action planner 36 sequentially generates an action plan for causing the vehicle 3 to travel along the route. More specifically, first, the action planner 36 determines events for the vehicle 3 to travel in the target lane determined by the route determining unit 17D without coming into contact with any obstacles. The action planner 36 generates a target trajectory on which the vehicle 3 should travel in the future based on the determined events. The target trajectory is a sequence of trajectory points that are the points the vehicle 3 should reach at each time. The action planner 36 may generate the target trajectory based on a target speed (target vehicle speed) and target acceleration set for each event.

The action planner 36 generates a merging event when receiving a merging control instruction related to the merging event from the server 1. The action planner 36 may set the target speed and target acceleration for the merging event based on the merging control instruction, and generate a target trajectory based on the target speed and the target acceleration.

The travel control unit 32 controls the propulsion device 11, the brake device 12, and the steering device 13 such that the vehicle 3 passes through the target trajectory generated by the action planner 36 at the scheduled time.

(Server 1)

The server 1 is a computer composed of an MPU (microprocessor), ROM, RAM, and the like. The server 1 executes various vehicle control as the MPU executes a calculation process according to a program. The server 1 may be configured as a single piece of hardware, or may be configured as a unit composed of plural pieces of hardware. Furthermore, at least a portion of each functional unit of the server 1 may be realized by hardware such as an LSI, an ASIC, and an FPGA, or may be realized by a combination of software and hardware. The program may be stored in a non-volatile storage device such as an HDD and flash memory of the server 1. Alternatively, the program may be stored in a removable storage medium such as a DVD or a CD-ROM and installed in the storage device of the server 1 as the storage medium is read by a reading device. Alternatively, the program may be downloaded in the storage device of the server 1 via a communication line such as the Internet and installed in the storage device thereof. The server 1 as a computer executes a travel control method that will be described later for executing travel control of the vehicles 3. The program causes the server 1 to execute the travel control of the vehicles 3 (mobile bodies). As shown in FIG. 1, the server 1 includes a non-transitory computer-readable storage medium 1A including a program 1B for executing the travel control of the vehicles 3. The program 1B, when executed by the server 1 as a computer, executes a vehicle control method (mobile body control method) that will be described later.

As shown in FIG. 1, the server 1 includes a communicator 41, a vehicle detector 42 (mobile body detector), a regulation body detector 43, a distance calculator 44, a traffic congestion degree acquirer 45, a movement controller 46, and a map information database 47. The communicator 41 communicates with the vehicle control device 4 of each vehicle 3 via the communication network 2. The map information database 47 stores map information. The map information includes information about the shapes and positions of the first travel route 101 and the second travel route 102 in the merging area 100, and the position of the regulation body 107.

The vehicle detector 42 acquires the position of a first vehicle 3A (first mobile body) traveling along the first travel route 101 and the position of a second vehicle 3B (second mobile body) traveling along the second travel route 102. The vehicle detector 42 may acquire the speeds of the first vehicle 3A and the second vehicle 3B in addition to the positions of the first vehicle 3A and the second vehicle 3B. The vehicle detector 42 may communicate with the first vehicle 3A and thereby acquire the position and speed of the first vehicle 3A from the first vehicle 3A. Further, the vehicle detector 42 may communicate with the second vehicle 3B and thereby acquire the position and speed of the second vehicle 3B from the second vehicle 3B. The vehicle detector 42 may communicate with the first vehicle 3A and thereby acquire the position and speed of the first vehicle 3A and the position and speed of the second vehicle 3B from the first vehicle 3A. Further, the vehicle detector 42 may communicate with the second vehicle 3B and thereby acquire the position and speed of the first vehicle 3A and the position and speed of the second vehicle 3B from the second vehicle 3B. Further, the vehicle detector 42 may communicate with a vehicle monitoring sensor 117 arranged in the merging area 100 and thereby acquire the position and speed of the first vehicle 3A and the position and speed of the second vehicle 3B detected by the vehicle monitoring sensor 117. The vehicle monitoring sensor 117 is composed of sensors such as a radar, a lidar, and a camera, and detects the position and speed of the vehicles 3A and 3B traveling along the first travel route 101 and the second travel route 102.

The position of each vehicle 3A and 3B may be the position of a representative point thereof. The representative point may be the center of gravity of each vehicle 3, the center of each vehicle 3 in the front-and-rear direction and the lateral direction, the center of a front or rear end of each vehicle 3 in the lateral direction, a corner position of each vehicle 3, and the like.

The regulation body detector 43 detects the position of the regulation body 107 arranged on the boundary between the first travel route 101 and the second travel route 102. The regulation body detector 43 may communicate with the first vehicle 3A or the second vehicle 3B and thereby acquire the position of the regulation body 107 including the position of the regulation body end 107A from the first vehicle 3A or the second vehicle 3B. Further, the regulation body detector 43 may acquire the position of the regulation body end 107A based on the map information stored in the map information database 47.

The distance calculator 44 acquires a first distance D1 from the first vehicle 3A to the second vehicle 3B, and a second distance D2 from the first vehicle 3A to the regulation body end 107A. The regulation body end 107A is an end of the regulation body 107 in the travel direction of the first travel route 101. The distance calculator 44 calculates the first distance D1 and the second distance D2 based on the position of the first vehicle 3A and the position of the second vehicle 3B acquired by the vehicle detector 42 and the position of the regulation body end 107A acquired by the regulation body detector 43. The distance calculator 44 may acquire, as the first distance D1, the distance from the center of a front end of the first vehicle 3A to the center of a rear end of the second vehicle 3B. Further, the distance calculator 44 may acquire, as the second distance D2, the distance from the center of the front end of the first vehicle 3A to the regulation body end 107A.

The traffic congestion degree acquirer 45 acquires a traffic congestion degree of the first travel route 101. The traffic congestion degree is an index that represents the degree of congestion and may have a plurality of levels. The plurality of levels may be two levels of zero (not congested) and one (congested), or may be three or more levels. The value of the traffic congestion degree may increase as the degree of congestion becomes higher. The traffic congestion degree acquirer 45 may acquire traffic congestion information via the communication network 2 and set the traffic congestion degree based on the traffic congestion information. Further, the traffic congestion degree acquirer 45 may set the traffic congestion degree based on the speed of the first vehicle 3A acquired by the vehicle detector 42. Further, the traffic congestion degree acquirer 45 may set the traffic congestion degree based on the inter-vehicle distance between the first vehicle 3A and the vehicle 3 traveling in front of the first vehicle 3A. In this case, the external environment detector

34 of the first vehicle 3A detects the inter-vehicle distance between the first vehicle 3A and the vehicle 3 traveling in front of the first vehicle 3A based on a signal from the external environment sensor 14, and transmits the detected inter-vehicle distance to the traffic congestion degree acquirer 45 via the communication network 2.

The movement controller 46 executes movement control of at least one of the first vehicle 3A and the second vehicle 3B in the merging area 100 to avoid the interference between the first vehicle 3A traveling along the first travel route 101 and the second vehicle 3B traveling along the second travel route 102.

Figure 4:
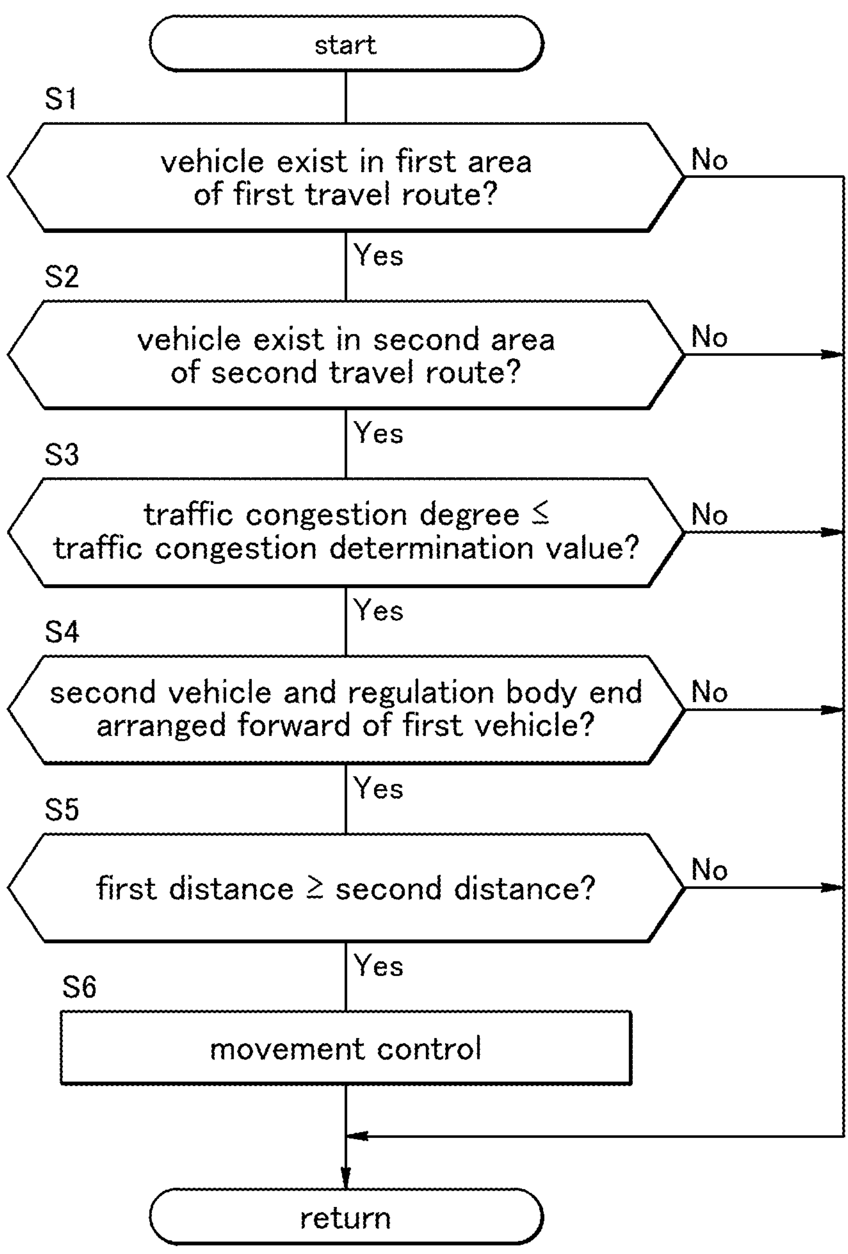
FIG. 4 is a flowchart of the control executed by a movement controller.

The movement controller 46 executes the movement control of at least one of the first vehicle 3A or the second vehicle 3B based on the flow of the vehicle control shown in FIG. 4. The movement controller 46 may repeat the vehicle control shown in FIG. 4 at time intervals of, for example, several microseconds.

First, the movement controller 46 determines whether the vehicle 3 (the first vehicle 3A) exists in the first area 111 of the first travel route 101 (S1). The movement controller 46 makes the determination based on the position of the first vehicle 3A traveling along the first travel route 101 detected by the vehicle detector 42.

In a case where the vehicle 3 (the first vehicle 3A) exists in the first area 111 (the determination result of S1 is Yes), the movement controller 46 determines whether the vehicle 3 (the second vehicle 3B) exists in the second area 112 of the second travel route 102 (S2). The movement controller 46 makes the determination based on the position of the second vehicle 3B traveling along the second travel route 102 detected by the vehicle detector 42.

In a case where the vehicle 3 (the second vehicle 3B) exists in the second area 112 (the determination result of S2 is Yes), the movement controller 46 determines whether the traffic congestion degree of the first travel route 101 is equal to or less than a prescribed traffic congestion determination value (S3). The traffic congestion degree is acquired by the traffic congestion degree acquirer 45. The traffic congestion determination value is set to a value that makes it possible to determine that the first travel route 101 is not congested. For example, the traffic congestion determination value may be set to a value that makes it possible to travel at 50 km/h along the first travel route 101.

In a case where the traffic congestion degree is equal to or less than the traffic congestion determination value (the determination result of S3 is Yes), the movement controller 46 determines whether the second vehicle 3B on the second travel route 102 and the regulation body end 107A are arranged forward of the first vehicle 3A on the first travel route 101 (S4).

In a case where the second vehicle 3B and the regulation body end 107A are arranged forward of the first vehicle 3A (the determination result of S4 is Yes), the movement controller 46 determines whether the first distance D1 from the first vehicle 3A to the second vehicle 3B is equal to or more than the second distance D2 from the first vehicle 3A to the regulation body end 107A (S5). The first distance D1 and the second distance D2 are calculated by the distance calculator 44.

In a case where the first distance D1 is equal to or more than the second distance D2 (the determination result of S5 is Yes), the movement controller 46 executes the movement control of at least one of the first vehicle 3A (first mobile body) and the second vehicle 3B (second mobile body) (S6). When the second vehicle 3B moves to the first travel route 101, the inter-vehicle distance between the first vehicle 3A and the second vehicle 3B is maintained at a prescribed value or more by the movement control to avoid the interference between the first vehicle 3A and the second vehicle 3B. Accordingly, at least one of the first vehicle 3A and the second vehicle 3B accelerates or decelerates by the movement control. In the movement control, the movement controller 46 sets the target acceleration or target speed of at least one of the first vehicle 3A and the second vehicle 3B to accelerate or decelerate at least one of the first vehicle 3A and the second vehicle 3B.

As an example, in the movement control, the movement controller 46 estimates an entry start time that is a time when the second vehicle 3B starts entering the first travel route 101, the position and speed of the first vehicle 3A at the entry start time, and the position and speed of the second vehicle 3B at the entry start time based on the position and speed of the first vehicle 3A and the position and speed of the second vehicle 3B. Then, when the inter-vehicle distance between the first vehicle 3A and the second vehicle 3B becomes less than a prescribed value at the entry start time, the movement controller 46 sets the target acceleration or target speed of at least one of the first vehicle 3A and the second vehicle 3B to execute the first control, the second control, or both of the first and second control. The first control is the control for accelerating one of the first vehicle 3A and the second vehicle 3B that is arranged forward of the other at the entry start time. The second control is the control for decelerating one of the first vehicle 3A and the second vehicle 3B that is arranged rearward of the other at the entry start time.

In a case of setting the target acceleration or target speed of the first vehicle 3A in the movement control, the movement controller 46 transmits a travel instruction including the set target acceleration or set target speed to the vehicle control device 4 of the first vehicle 3A via the communication network 2. Further, in a case of setting the target acceleration or target speed of the second vehicle 3B in the movement control, the movement controller 46 transmits a travel instruction including the set target acceleration or set target speed to the vehicle control device 4 of the second vehicle 3B via the communication network 2.

The travel instruction may include a notification instruction for controlling the HMI 19 of each vehicle 3 and thereby giving a notification to the occupant.

Upon receiving the travel instruction from the server 1, the action planner 36 of the first vehicle 3A and the second vehicle 3B generates the merging event including the target trajectory for achieving the target acceleration or target speed included in the travel instruction. The travel control unit 32 controls the propulsion device 11, the brake device 12, and the steering device 13 such that each vehicle 3 passes through the target trajectory of the merging event generated by the action planner 36 at the scheduled time. In this way, the travel mode of each vehicle 3 is controlled based on the target acceleration or target speed of each vehicle 3 set by the movement controller 46 of the server 1.

Further, the vehicle control device 4 of each vehicle 3 may control the HMI 19 based on the notification instruction included in the travel instruction. The HMI 19 may notify, by images, video, or audio, that each vehicle 3 is being controlled based on the travel instruction.

In a case where the vehicle 3 (the first vehicle 3A) does not exist in the first area 111 of the first travel route 101 (the determination result of S1 is No), in a case where the vehicle 3 (the second vehicle 3B) does not exist in the second area 112 of the second travel route 102 (the determination result of S2 is No), in a case where the traffic congestion degree is more than the traffic congestion determination value (the determination result of S3 is No), in a case where the second vehicle 3B or the regulation body end 107A is not arranged forward of the first vehicle 3A (the determination result of S4 is No), and in a case where the first distance D1 is less than the second distance D2 (the determination result of S5 is No), the travel control unit 32 does not execute the movement control of either the first vehicle 3A or the second vehicle 3B.

The server 1 in the above embodiment controls at least one of the first vehicle 3A and the second vehicle 3B in the merging area 100 to prevent the interference between the first vehicle 3A and the second vehicle 3B. The movement controller 46 executes the movement control of at least one of the first vehicle 3A and the second vehicle 3B in a case where the first distance D1 is equal to or more than the second distance D2, and does not execute the movement control of either the first vehicle 3A or the second vehicle 3B in a case where the first distance D1 is less than the second distance D2. Accordingly, in a region where the regulation body 107 that regulates a lane change (namely, a movement) from the second travel route 102 to the first travel route 101 exists, the movement control of the first vehicle 3A (first mobile body) caused by the second vehicle 3B (second mobile body) is not executed. In the second portion 102B of the second travel route 102 where the regulation body 107 exists, the second vehicle 3B cannot change lanes to the first travel route 101. Accordingly, it is not necessary to maintain the inter-vehicle distance between the first vehicle 3A and the second vehicle 3B, and the first vehicle 3A does not need to decelerate or accelerate relative to the second vehicle 3B. Accordingly, the server 1 can execute appropriate movement control in a region of the merging area 100 where the regulation body 107 exists. Further, in a case where the first travel route 101 is congested or in a case where the second vehicle 3B is arranged rearward of the first vehicle 3A, the movement controller 46 does not execute unnecessary movement control.

When the movement control is executed in the first vehicle 3A and the second vehicle 3B, an alert is given by the HMI 19, so that the occupant can recognize that the movement control is being executed, and can understand the behavior of the first vehicle 3A and the second vehicle 3B (mobile body).

In another embodiment, instead of the server 1, the vehicle control device 4 of the first vehicle 3A traveling along the first travel route 101 functions as the mobile body control device. The vehicle control device 4 further includes a traffic congestion degree acquirer 38. The configuration of the traffic congestion degree acquirer 38 may be the same as the configuration of the traffic congestion degree acquirer 45 of the server 1.

The external environment detector 34 detects the position of the second vehicle 3B traveling along the second travel route 102 and the position of the regulation body 107. Further, the external environment detector 34 may also acquire the speed of the second vehicle 3B based on the change in the position of the second vehicle 3B. The own vehicle position detector 35 (own mobile body position detector) acquires the position of the own vehicle 3A (first vehicle 3A). Further, the own vehicle position detector 35 may also acquire the speed of the own vehicle 3A based on the change in the position of the own vehicle 3A.

Figure 5:
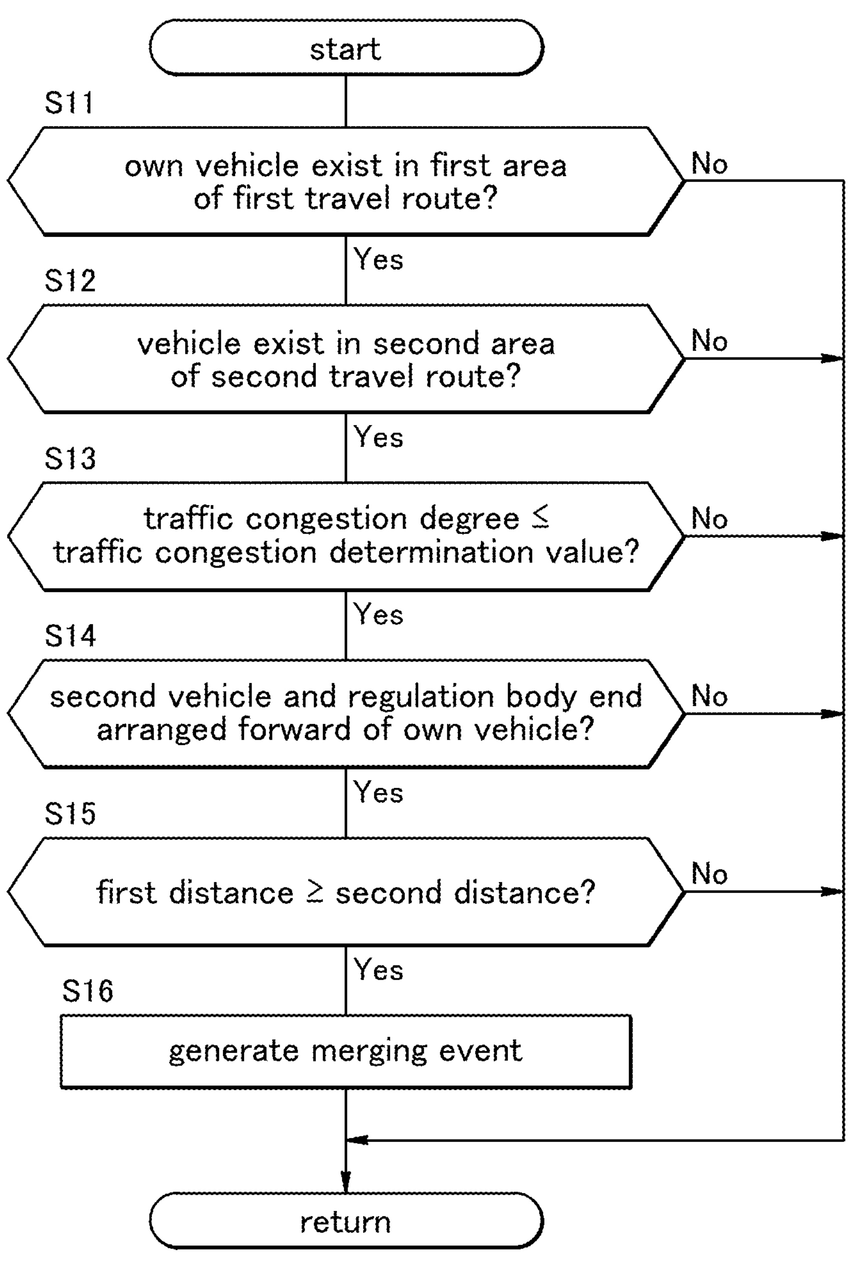
FIG. 5 is a flowchart of the control executed by an action planner.

The action planner 36 generates an action plan for the first vehicle 3A based on the flow of vehicle control shown in FIG. 5.

First, the action planner 36 determines whether the own vehicle 3A exists in the first area 111 of the first travel route 101 (S11). The action planner 36 makes the decision based on the own vehicle position detected by the own vehicle position detector 35.

In a case where the own vehicle 3A exists in the first area 111 (the determination result of S11 is Yes), the action planner 36 determines whether the vehicle 3 (the second vehicle 3B) exists in the second area 112 of the second travel route 102 (S12). The action planner 36 makes the decision based on the position of the second vehicle 3B detected by the external environment detector 34.

In a case where the vehicle 3 (the second vehicle 3B) exists in the second area 112 (the determination result of S12 is Yes), the action planner 36 determines whether the traffic congestion degree of the first travel route 101 is equal to or less than the traffic congestion determination value (S13). The traffic congestion degree is acquired by the traffic congestion degree acquirer 38.

In a case where the traffic congestion degree is equal to or less than the traffic congestion determination value (the determination result of S13 is Yes), the action planner 36 determines whether the second vehicle 3B on the second travel route 102 and the regulation body end 107A are arranged forward of the own vehicle 3A on the first travel route 101 (S14).

In a case where the second vehicle 3B and the regulation body end 107A are arranged forward of the own vehicle 3A (the determination result of S14 is Yes), the action planner 36 determines whether the first distance D1 from the own vehicle 3A to the second vehicle 3B is equal to or more than the second distance D2 from the own vehicle 3A to the regulation body end 107A (S15). The action planner 36 may calculate the first distance D1 and the second distance D2 based on the position of the own vehicle 3A, the position of the second vehicle 3B, and the position of the regulation body end 107A.

In a case where the first distance D1 is equal to or more than the second distance D2 (the determination result of S15 is Yes), the action planner 36 executes movement control of the own vehicle 3A (first mobile body) (S16). In the movement control, the action planner 36 generates a merging event to prevent the interference between the own vehicle 3A and the second vehicle 3B when the second vehicle 3B moves to the first travel route 101. In the merging event, the action planner 36 sets the target acceleration or target speed of the own vehicle 3A, and generates the target trajectory for achieving the target acceleration or target speed thereof such that the inter-vehicle distance between the own vehicle 3A and the second vehicle 3B is maintained at a prescribed value or more. The travel control unit 32 controls the propulsion device 11, the brake device 12, and the steering device 13 such that each vehicle 3 passes through the target trajectory of the merging event generated by the action planner 36 at the scheduled time. In this way, the travel mode of the own vehicle 3A is controlled based on the target acceleration or target speed of the own vehicle 3A set by the action planner 36.

In a case where the own vehicle 3A does not exist in the first area 111 of the first travel route 101 (the determination result of S11 is No), in a case where the vehicle 3 (the second vehicle 3B) does not exist in the second area 112 of the second travel route 102 (the determination result of S12 is No), in a case where the traffic congestion degree is more than the traffic congestion determination value (the determination result of S13 is No), in a case where the second vehicle 3B or the regulation body end 107A is not arranged forward of the own vehicle 3A (the determination result of S14 is No), and in a case where the first distance D1 is less than the second distance D2 (the determination result of S15 is No), the action planner 36 does not generate the merging event.

The vehicle control device 4 may control the HMI 19 during the execution of the merging event. The HMI 19 may notify, by images, video, or audio, that each vehicle 3 is being controlled based on the travel instruction.

According to this embodiment, the vehicle control device 4 can independently execute the movement control of the own vehicle 3A without communicating with the server 1.

This concludes the descriptions of the specific embodiments, but the present invention can be widely modified without being limited to the above embodiments. For example, the second distance D2 may be a distance between the first vehicle 3A and a point that is shifted forward or rearward from the regulation body end 107A by a prescribed distance.

The invention claimed is:

1. A mobile body control device configured to execute movement control of at least one of a first mobile body moving along a first travel route and a second mobile body moving along a second travel route in a merging area including the first travel route, the second travel route that merges with the first travel route, and a regulation body arranged on a boundary between the first travel route and the second travel route and configured to regulate a movement from the second travel route to the first travel route, the mobile body control device comprising:

a mobile body detector configured to acquire a position of the first mobile body and a position of the second mobile body;

a regulation body detector configured to detect a position of the regulation body;

a distance calculator configured to acquire a first distance from the first mobile body to the second mobile body and a second distance from the first mobile body to a regulation body end that is an end of the regulation body in a travel direction of the first travel route; and a movement controller configured to execute the movement control of the at least one of the first mobile body and the second mobile body in the merging area by accelerating or decelerating at least one of the first mobile body and the second mobile body so as to maintain an inter-vehicle distance between the first mobile body and the second mobile body equal to or greater than a predetermined value, thereby avoiding interference between the first mobile body and the second mobile body, wherein the movement controller is configured to execute the movement control of the at least one of the first mobile body and the second mobile body in a case where the first distance is equal to or more than the second distance, and not to execute the movement control of either the first mobile body or the second mobile body in a case where the first distance is less than the second distance.

2. The mobile body control device according to claim 1, wherein the movement controller is configured to accelerate the at least one of the first mobile body and the second mobile body by the movement control in a case where the first distance is equal to or more than the second distance.

3. The mobile body control device according to claim 1, further comprising a traffic congestion degree acquirer configured to acquire a traffic congestion degree of the first travel route, wherein the movement controller is configured to execute the movement control of the at least one of the first mobile body and the second mobile body in a case where the first distance is equal to or more than the second distance and the traffic congestion degree is equal to or less than a prescribed traffic congestion determination value, and not to execute the movement control of either the first mobile body or the second mobile body in a case where the first distance is less than the second distance or the traffic congestion degree is more than the traffic congestion determination value.

4. The mobile body control device according to claim 1, wherein the movement controller is configured to execute the movement control of the at least one of the first mobile body and the second mobile body in a case where the first distance is equal to or more than the second distance and the second mobile body and the regulation body end are arranged forward of the first mobile body, and not to execute the movement control of either the first mobile body or the second mobile body in a case where the first distance is less than the second distance or the second mobile body or the regulation body end is not arranged forward of the first mobile body.

5. The mobile body control device according to claim 1, wherein the distance calculator is configured to acquire, as the first distance, a distance from a center of a front end of the first mobile body to a center of a rear end of the second mobile body, and to acquire, as the second distance, a distance from the center of the front end of the first mobile body to the regulation body end.

6. The mobile body control device according to claim 1, wherein when changing an acceleration of the at least one of the first mobile body and the second mobile body by the movement control, the movement controller is configured to control a notifier of the at least one of the first mobile body and the second mobile body the acceleration of which is changed and thereby to give a notification to an occupant that the movement control is being executed.

7. A mobile body control device provided in a first mobile body moving along a first travel route in a merging area including the first travel route, a second travel route that merges with the first travel route, and a regulation body arranged on a boundary between the first travel route and the second travel route and configured to regulate a movement from the second travel route to the first travel route, the mobile body control device comprising:

an external environment detector configured to detect a position of a second mobile body moving along the second travel route and a position of the regulation body;

an own mobile body position detector configured to detect a position of the first mobile body; and an action planner configured to execute movement control of the first mobile body in the merging area to avoid by accelerating or decelerating at least one of the first mobile body and the second mobile body so as to maintain an inter-vehicle distance between the first mobile body and the second mobile body equal to or greater than a predetermined value, thereby avoiding interference between the first mobile body and the second mobile body, wherein the action planner is configured to calculate a first distance from the first mobile body to the second mobile body and a second distance from the first mobile body to a regulation body end that is an end of the regulation body in a travel direction of the first travel route, to execute the movement control of the first mobile body in a case where the first distance is equal to or more than the second distance, and not to execute the movement control of the first mobile body in a case where the first distance is less than the second distance.

8. A mobile body control method for a computer to execute movement control of at least one of a first mobile body moving along a first travel route and a second mobile body moving along a second travel route in a merging area including the first travel route, the second travel route that merges with the first travel route, and a regulation body arranged on a boundary between the first travel route and the second travel route and configured to regulate a movement from the second travel route to the first travel route, the mobile body control method comprising:

acquiring a position of the first mobile body and a position of the second mobile body;

detecting a position of the regulation body;

acquiring a first distance from the first mobile body to the second mobile body and a second distance from the first mobile body to a regulation body end that is an end of the regulation body in a travel direction of the first travel route;

executing the movement control of the at least one of the first mobile body and the second mobile body in the merging area by accelerating or decelerating at least one of the first mobile body and the second mobile body so as to maintain an inter-vehicle distance between the first mobile body and the second mobile body equal to or greater than a predetermined value, thereby avoiding interference between the first mobile body and the second mobile body;

executing automatically the movement control of the at least one of the first mobile body and the second mobile body in a case where the first distance is equal to or more than the second distance; and not executing the movement control of either the first mobile body or the second mobile body in a case where the first distance is less than the second distance.

9. A non-transitory computer-readable storage medium, comprising a program for executing movement control of at least one of a first mobile body moving along a first travel route and a second mobile body moving along a second travel route in a merging area including the first travel route, the second travel route that merges with the first travel route, and a regulation body arranged on a boundary between the first travel route and the second travel route and configured to regulate a movement from the second travel route to the first travel route, wherein the program, when executed by a computer, executes a mobile body control method comprising:

acquiring a position of the first mobile body and a position of the second mobile body;

detecting a position of the regulation body;

acquiring a first distance from the first mobile body to the second mobile body and a second distance from the first mobile body to a regulation body end that is an end of the regulation body in a travel direction of the first travel route;

executing the movement control of the at least one of the first mobile body and the second mobile body in the merging area by accelerating or decelerating at least one of the first mobile body and the second mobile body so as to maintain an inter-vehicle distance between the first mobile body and the second mobile body equal to or greater than a predetermined value, thereby avoiding interference between the first mobile body and the second mobile body;

executing the movement control of the at least one of the first mobile body and the second mobile body in a case where the first distance is equal to or more than the second distance; and not executing the movement control of either the first mobile body or the second mobile body in a case where the first distance is less than the second distance.

* * * * *